(No Model.)
B. CRISLER.
TIRE TIGHTENER.
No. 319,885. Patented June 9, 1885.
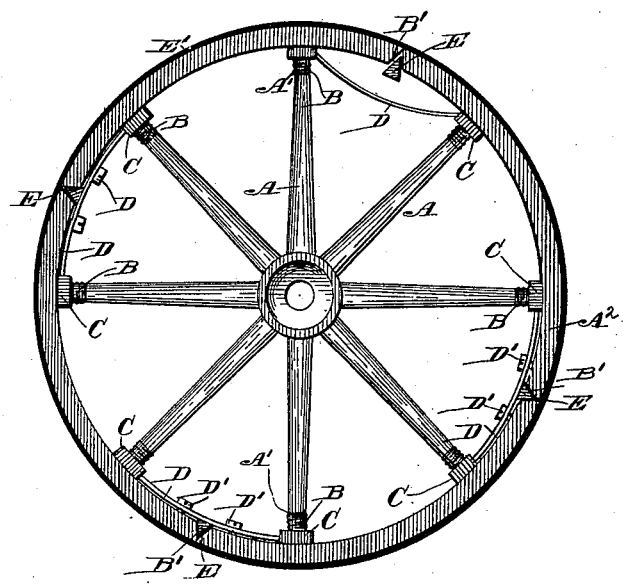
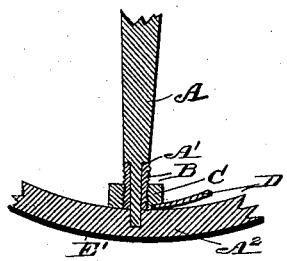
WITNESSES.
INVENTOR.
ATTORNEYS.

UNITED STATES PATENT OFFICE.

BASCOM CRISLER, OF CRAWFORD, MISSISSIPPI.

TIRE-TIGHTENER.

SPECIFICATION forming part of Letters Patent No. 319,885, dated June 9, 1885.

Application filed April 11, 1885. (No model.)

*To all whom it may concern:*

Be it known that I, BASCOM CRISLER, a citizen of the United States of America, residing at Crawford, in the county of Lowndes and State of Mississippi, have invented certain new and useful Improvements in Vehicle-Wheels, of which the following is a specification, reference being had therein to the accompanying drawings.

The object of my improvement in vehicle-wheels is to cause the felly, which to some extent constantly shrinks, no matter how seasoned the lumber, to remain uniformly tightly secured against the inner periphery of the tire, even when expanded by the heat of the sun, and thus by preventing loosening of the felly to avoid the obvious train of evil consequences arising therefrom; and it consists in the combination and arrangement of the parts, substantially as hereinafter fully set forth, and pointed out in the claims.

In the accompanying drawings, Figure 1 is a side elevation of a wheel embodying my improvement, and Fig. 2 is a detail view thereof.

In the construction of my vehicle-wheel I form each spoke A with a shoulder, A', and a rounded end, whereon is inserted a ferrule, B, having a male screw adapted for reception of a thick and corresponding nut, C, with which the felly $A^2$ is tightened against the tire E' as tightly as when the latter is shrunk upon it. Each end of each spring D may either be held between one of these nuts and the inner periphery of the felly or lodge against the nut C when pressed down upon the wedge-keys E, and is additionally secured in position by means of the screws D'. The wedge-keys E are disposed at the point of connection between each felly-section on the inner periphery of felly $A^2$ in the wedge-shaped recesses B', the sections of the felly for this purpose having their ends thus formed correspondingly beveled. Each wedge-key is inserted in its corresponding recess, the wedge-keys being formed slightly larger than the recesses, and each wedge-key in practice is constantly forced "home" in its recess by the spring D, which spring has slotted apertures therein for reception of screws D', which screws hold the spring partially retracted in position to the felly. Thus constructed, when the felly becomes loosened it is readily tightened, without the necessity of taking the wheel to pieces, by simply tightening the nuts C and the screws D'.

Having thus fully described my invention, what I claim, and desire to secure by Letters Patent, is—

1. In a vehicle-wheel, the springs D, secured by nuts C, and screws D', for securing the wedge-keys E in the recesses between the fellies, substantially as shown and described.

2. The combination of the springs D, wedge-keys E, and felly $A^2$, substantially as shown, and for the purpose described.

3. A vehicle-wheel whose fellies are tightened as against shrinkage thereof and expansion of the tire by means of wedge-keys secured in position by springs D, held by nuts C, substantially as shown and described.

In testimony whereof I affix my signature in presence of two witnesses.

BASCOM CRISLER.

Witnesses:
 JOS. WALKER,
 S. L. MCGEE.